March 28, 1961 G. A. LYON 2,977,152
WHEEL COVER
Filed Sept. 15, 1959 4 Sheets-Sheet 1
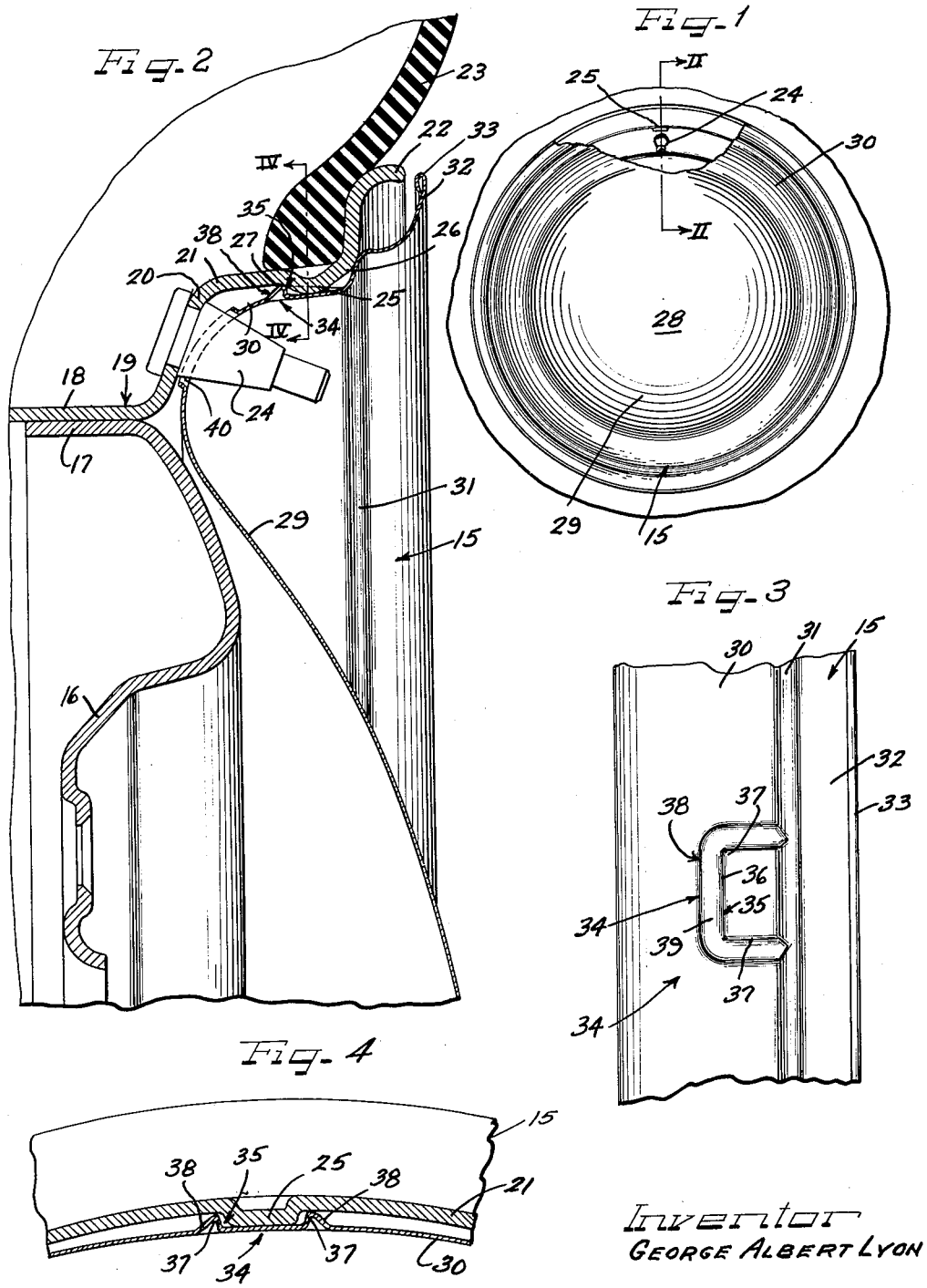
Inventor
GEORGE ALBERT LYON March 28, 1961  G. A. LYON  2,977,152
WHEEL COVER
Filed Sept. 15, 1959  4 Sheets-Sheet 2
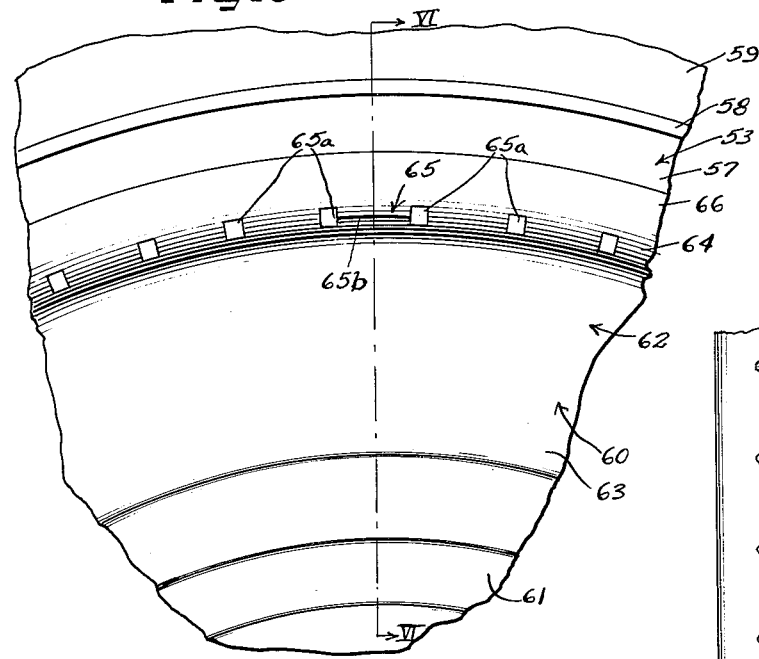
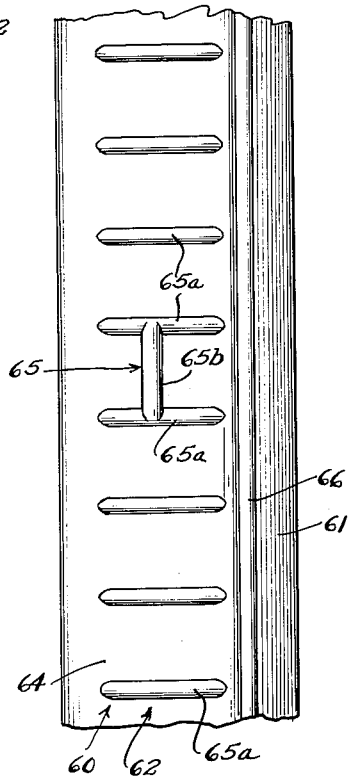
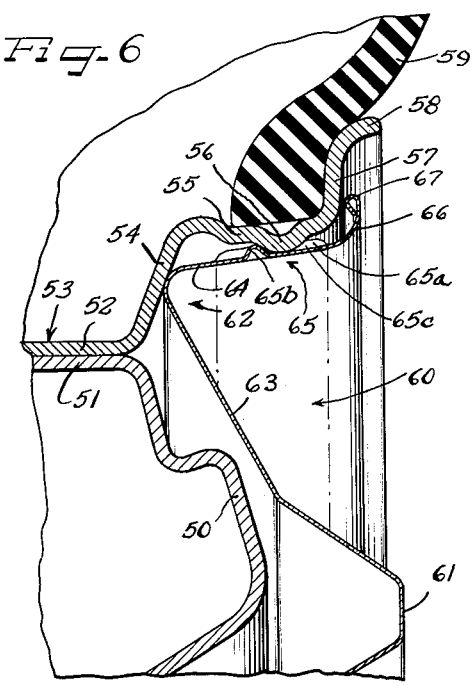
Inventor
George Albert Lyon
by
Attys.

March 28, 1961 G. A. LYON 2,977,152
WHEEL COVER
Filed Sept. 15, 1959 4 Sheets-Sheet 3
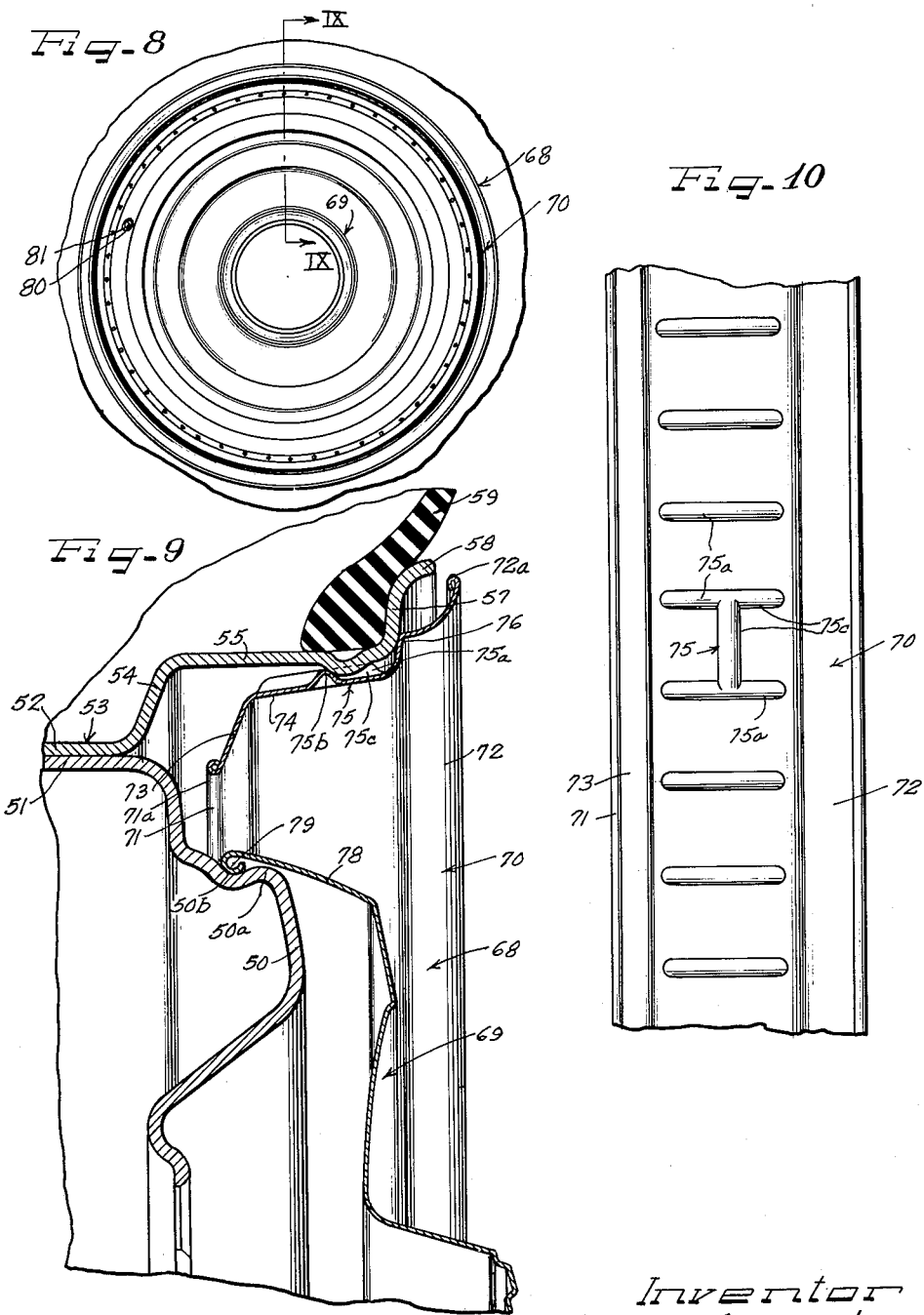
Inventor
GEORGE ALBERT LYON

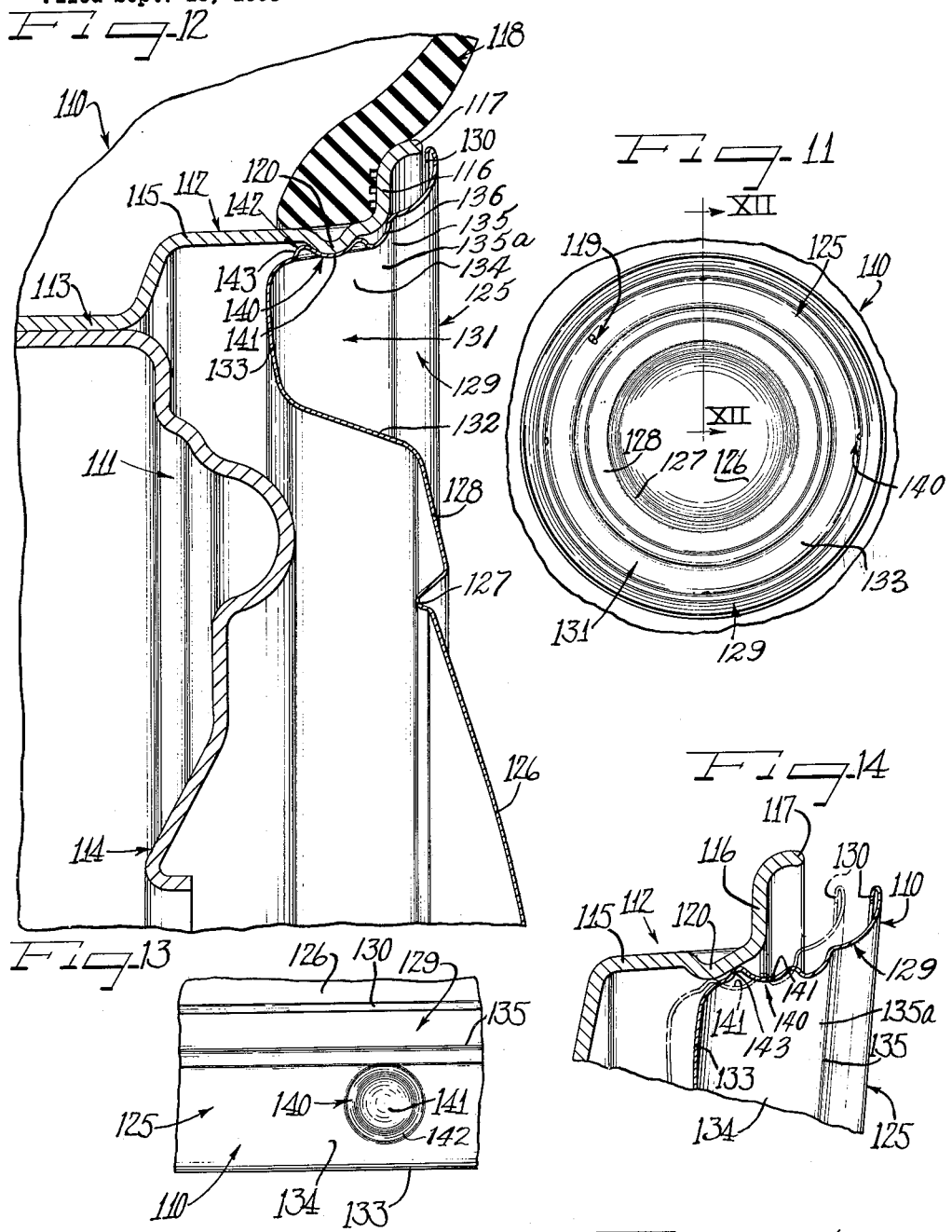

United States Patent Office 2,977,152
Patented Mar. 28, 1961

2,977,152
WHEEL COVER
George Albert Lyon, 13881 W. Chicago Blvd., Detroit 28, Mich.
Filed Sept. 15, 1959, Ser. No. 840,500
19 Claims. (Cl. 301—37)

This invention relates generally to a wheel structure and more particularly to a new and improved cover construction and the manner in which the cover is retained on a vehicle wheel.

The automobile industry is continuously in search of wheel covers which may be effectively maintained on a vehicle wheel and are relatively economical to manufacture on a large production basis. By the present invention, a flexible axial portion of a wheel cover is formed in a manner to provide circumferentially spaced seats or pockets which are each adapted for retaining cooperation with one of a series of circumferentially spaced bumps on a generally axial wheel portion. The term wheel cover is herein used in a generic sense and includes a full disc cover member or a ring member.

Accordingly, an object of this invention is to provide a new and improved cover construction that may be efficiently maintained on the wheel and is relatively economical to manufacture.

Another object of this invention is to provide a wheel and cover combination of the type where the cover may be easily snapped into retained engagement with the wheel and where the cover may be readily pried therefrom when desired and thereafter reapplied to the wheel without damaging the cover.

Still another object of this invention is to provide a cover construction capable of being engaged upon a wheel in interlocked engagement therewith at circumferentially spaced intervals.

Yet another object of this invention is to provide a cover construction which is effective and efficient in operation when assembled with a wheel, is economical to manufacture, and lends itself to being produced on a large production basis.

Still another important object of the present invention is to provide a wheel structure including a novel cover or ring for the outer side thereof on which embossings are provided as means to retain the cover on the wheel.

An important feature of the present invention relates to providing a cover with reinforced integrally formed shoulder means which are adapted to engage behind bumps formed on a tire rim flange and which shoulder means also includes means formed integrally with the cover to insure corotation of the cover when it is mounted on the wheel.

A feature of the present invention relates to the provision of radially extending circumferentially spaced ribs on an axial flexible resilient cover portion each of which defines a seat, the seat being adapted to retainingly receive bumps on the wheel in interlocked engagement.

Yet another feature relates to providing a seat defined by a rib or rib area or a depressed area which may be annular or generally U-shaped in configuration.

Other objects and features of the present invention will more fully become apparent from the following description taken in conjunction with the accompanying sheets of drawings illustrating several embodiments thereof, and in which:

Figure 1 is a fragmentary side view of the wheel structure having a cover with the features of this invention;

Figure 2 is an enlarged fragmentary cross-sectional view taken on the line II—II of Figure 1 looking in the direction indicated by the arrows;

Figure 3 is an enlarged fragmentary edge elevation showing in detail the cover margin;

Figure 4 is a fragmentary cross-sectional view taken on the line IV—IV of Figure 2 looking in the direction indicated by the arrows;

Figure 5 is a fragmentary side view of the wheel structure having a modified cover construction which possesses features of the present invention;

Figure 6 is a fragmentary cross-sectional view taken on the line VI—VI of Figure 5 looking in the direction indicated by the arrows;

Figure 7 is an enlarged fragmentary edge elevation of the modified cover shown in Figures 5 and 6;

Figure 8 is a fragmentary side view of another modified form of wheel structure having a ring with the features of this invention;

Figure 9 is an enlarged fragmentary cross-sectional view taken on the line IX—IX looking in the direction indicated by the arrows, as seen in Figure 8;

Figure 10 is an enlarged fragmentary edge elevation (similar to Figure 3) showing in detail the ring margin of Figures 8 and 9;

Figure 11 is a side elevation of a wheel structure;

Figure 12 is an enlarged fragmentary cross-sectional view taken substantially on the line II—II of Figure 1 looking in the direction indicated by the arrows;

Figure 13 is an enlarged fragmentary edge elevation of the cover; and

Figure 14 is an enlarged fragmentary cross-sectional view, in full and dotted lines, showing the flexible nature of the cover as it is assembled upon a vehicle wheel.

As shown on the drawing:

Referring now to the drawings, and more particularly to Figures 1–4, a cover 15 is adapted to be disposed at the outer side of a vehicle wheel including a disk spider wheel body 16 having at the outer margin thereof a generally axially inwardly extending attachment flange 17 secured in any suitable manner to a base flange 18 of a tire rim 19 (Fig. 2). It will be appreciated that at suitable intervals if desired, the flange 17 may be inset to provide openings through the wheel for air circulation and the like. From the base flange 18, extends a rim side flange 20 sloping radially and axially outwardly and merging with an intermediate generally axially outwardly and radially outwardly oblique intermediate flange 21 which joins a generally radially outwardly and then axially outwardly turned terminal flange 22. The construction and relationship of the rim flanges are such that a tire and tube assembly or a tubeless tire 23 may be supported thereon as shown in Figure 2. For inflation of the tire a valve stem 24 is shown projecting through the side flange 20.

In the present instance the intermediate flange 21 of the tire rim 19 has provided thereon a plurality of circumferentially spaced bumps or shoulders 25 which are pressed out and extend radially inwardly from the intermediate flange. At the junction of the intermediate flange and the outwardly turned flange 22 there is provided a rounded generally radially and axially inwardly extending lead-in or camming surface 26 which is adapted to facilitate in the progressive flexing of the retaining means hereinafter discussed.

According to the present invention the cover 15 is constructed and arranged to be retained on the wheel by interengagement of retaining means thereon behind the shoulder or bump 25 and within a groove 27 defined by the axially inner side of the bump and the intermediate flange 21.

To this end, the cover 15 comprises a stamped or drawn sheet metal member which in the present instance is of the full disk type and is of a diameter to substantially entirely cover the outer side of the wheel. Suitable sheet metal stock or other material may be used in making the cover, stainless steel having been found to be one of the most desirable types of material.

The cover 15 has a central crown area 28 for overlying the central portion of the wheel. Spaced radially outwardly from the crown 28 is an annular outer marginal substantially rigid cover portion 29 extending generally radially outwardly and axially inwardly for overlying the junction of the tire rim and wheel body. Merging with cover portion 29 is a relatively resilient generally radially and axially outwardly extending portion 30 for overlying a portion of the tire rim and extending generally axially outwardly and then merging into a rim bottoming pry-off rib 31. The rib 31 is connected to the outer margin 32 of the cover and the margin 32 terminates in an underturned reinforcing and finishing bead 33 which may be disposed in assembly adjacent to the tip of the terminal flange 22. Behind the outer margin 32 is provided a substantial chamber with the terminal flange to afford a concealed housing for wheel balancing weights.

Provided on the intermediate flange 30 and formed by being pressed out generally radially outwardly thereof are a plurality of circumferentially spaced U-shaped ribs or rib areas or rib-like areas which according to certain features of the first illustrated form of the invention comprise U-shaped ribs or rib-like projections or elements or embossings or pressed out or depressed socket areas 34 capable of being engaged in tensioned cover retaining relationship with the bumps. The rib or socket areas 34 define pockets which are adapted to receive the bumps 25. It will be appreciated that each of the embossings or shoulder-like portions 34 are formed integral with the cover and in the first form of the invention comprise a continuous U-shaped rib.

Each of the elements 34 includes continuous integral shoulder means 35 for engaging behind and on two sides of the bumps thereby constituting a three-sided engagement of the bumps. In other words, portion 36 of the means 35 which engages behind the bumps 25 serves to retain the cover on the wheel; and circumferentially spaced portions 37—37 of the means 35 which are joined together with portion 36 serve to insure relative corotation of the cover and wheel.

Each of the portions 36, 37—37 has a continuous integrally formed angled reinforcing portion or rib 38 backing up the portions which engage on the three sides of the bumps. The portion 39 of the reinforcing rib 38 which backs up shoulder 36 also serves as a lead-in inclined camming surface on which the cover is progressively cammed over the bumps into retaining engagement.

Applying the cover 15 to the outer side of the wheel, it is generally centered relative to the wheel with the valve stem 24 projecting through an opening 40 provided in the cover serving to center same with respect to the wheel. Any suitable number of openings 40 may be provided if surplus embossings 34 are provided in case of damage to one or more of the embossings so that the valve stem may be inserted through any one of the openings to align different embossings with the bumps provided on the wheel. In other words, the opening 40 is so positioned that each of the retaining bumps 25 and the embossings 34 are generally axially aligned. Thereafter an inward pressure is exerted against the cover member and more particularly the outer cover portion 32 thereof to cause the intermediate flange 30 to flex inwardly as the rib 39 and shoulder 36 are progressively cammed over and nestingly bottomed behind the bumps 34 and in the groove 27. In other words, the retaining means 34 snap behind and into the groove 27.

For removing the cover from the wheel, a pry-off tool such as a screw driver or the like, may be applied behind the outer edge bead 33 and levered against the terminal flange 22, with additional pry-off leverage exerted against the reinforcing and pry-off shoulder 31 as the tool is worked further under the cover, until the embossings 34 of the cover are resiliently flexed out of the groove 27 and outwardly past the retaining bumps 25.

When the cover is assembled on the wheel it will be noted that rib 31 is adapted to bottom on the junction of the intermediate flange 21 and the terminal flange 22. It is in this manner that an additional back-up is provided for the retaining engagement between the embossings 34 and the bumps 25. Furthermore, in so doing the embossings are precluded from being urged axially inwardly out of retaining engagement with the groove 27.

Shown in Figures 5–7 is a modified form of my invention and the reference numeral 50 indicates generally a disk spider wheel body which has a base flange 51 suitably secured to a rim base flange 52 on a multi-flange stepped tire rim 53. Connected to the rim base flange 52 is a radial rim flange 54 which is in turn connected to an intermediate generally axially outwardly extending rim flange 55. The intermediate rim flange 55 faces radially inwardly and is provided with circumferentially spaced bumps 56. Disposed at the axially outer end of the intermediate rim flange 55 is a generally radially outwardly extending rim flange 57 and a generally axially outwardly extending terminal rim flange 58. Mounted upon the wheel is a pneumatic tire 59 which may be inflated in the same manner previously described in connection with Figures 1–4.

The reference numeral 60 indicates generally a wheel cover member which is adapted to be disposed at the outer side of the vehicle wheel and the cover may be made from any suitable material such as stainless steel. The cover 15 comprises a stamped or drawn sheet metal member which is of a diameter to substantially overlie and conceal the body and rim parts of the wheel.

The cover 60 is provided with a central crown area 61. Disposed radially outwardly of the central crown area 61 is a dished area 62 which includes axially outwardly diverging cover portions 63 and 64. The cover portion 64 is disposed immediately adjacent to the intermediate rim flange 55 as well as the circumferentially spaced bumps 56 and has a diameter normally slightly larger than the inside diameter of the circumferentially spaced bumps 56. Provided on the radially outer cover portion 64 are a plurality of circumferentially spaced H-shaped rib-like areas which according to certain features of the present invention comprise H-shaped rib-like projections or elements or embossings or pressed out socket areas 65. Each of the H-shaped areas 65 may be described as comprising a pair of U-shaped areas since opposite sides of the H-shaped areas define U-shaped socket areas.

To the end of providing socket areas 65 on the cover portion 64, the cover portion 64 is provided with a series of generally axially outwardly extending ribs 65a. Each of the ribs is pressed generally radially outwardly of the cover portion 64. At circumferentially spaced intervals certain of the ribs 65a are connected together by a transverse rib 65b which also is pressed radially outwardly of the cover portion 64. Any suitable number of these socket areas may be provided and it is desirable to provide a number in excess of the number of bumps on the wheel since if any one of the socket areas 65 become damaged then the cover may be rotated slightly and another set of socket areas may be used to sustain the cover upon the wheel as a result of the engagement of the socket areas with the rim bumps 56.

Each of the socket areas 65 utilizes the circumferentially extending rib portion 65b as well as a portion of the adjacent rib 65a—65a connected together by the circumferentially extending rib 65b to define continuous integral shoulder means 65c for engagement about three sides of each of the bumps. The portions 65a operate to insure relative corotation of the cover and the wheel. The portions of the ribs 65a disposed axially inwardly of the connecting rib 65a operate as lead-in means to aid in the relative axial alignment of the bumps 56 with respect to the transverse rib 65b and the assembly of the cover 60 upon the wheel.

The cover portion 64 terminates at its axially outer end in a generally radially outwardly extending marginal area 66 which in turn terminates in a pry-off bead 67. When the cover is in assembly upon the wheel the bottom of the dished area 62 is bottomed against the rim flange 54 while the pry-off bead area 67 is spaced slightly axially away from the rim flange 57 to allow a pry-off tool to be readily inserted underneath the cover when it is desired to remove the cover from the wheel since when a pry-off tool is inserted under the bead 67 the tension exerted by the cover portion 64 may be released in much the same manner as has been previously described in connection with the first form shown in Figures 1–4.

After the transverse ribs 65b have been placed in axial alignment with respect to the bumps 56 the cover is then urged axially inwardly to stress the transverse ribs 65b over the bumps 56 to effect assembly of the cover on the wheel. It will be appreciated the transverse ribs 65b are engaged at the axially inner side of the bumps 56 in resilient tensioned engagement therewith.

Shown in Figures 8–10 is still another modified form of my invention and it will be noted that the same reference numerals have been applied to the rim and body parts wherever possible which reference numerals were previously used in connection with the description of Figure 6.

The reference numeral 68 indicates generally a wheel cover member which is adapted to be disposed at the outer side of the vehicle wheel as shown in Figure 9 and the cover may be made of any suitable material such as stainless steel.

The cover structure 68 includes a central circular cover member 69 as well as a circular ring member 70.

The ring member 70 is provided with a radially inner ring margin 71 as well as a radially outer ring margin 72 which margins are beaded at 71a and 72a, respectively for reinforcing the ring 70. The inner ring margin is inclined radially and axially outwardly and includes a generally radially and axially outwardly extending ring portion 73 which is joined with a generally radially and axially outwardly inclined intermediate ring portion 74. The ring portion 74 is disposed immediately adjacent to the intermediate rim flange 55 as well as the circumferentially spaced bumps 56 and has a diameter normally slightly larger than the inside diameter of the circumferentially spaced bumps 56. Provided on the radially outer ring portion 74 are a plurality of circumferentially spaced H-shaped rib-like areas which according to certain features of the present invention comprise H-shaped rib-like projections or elements or embossings or pressed out socket areas 75. Each of the H-shaped areas 75 may be described as comprising a pair of U-shaped areas since opposite sides of the H-shaped areas define U-shaped socket areas.

Each of the socket areas 75 are defined by a pair of axially outwardly extending ribs 75a as well as by a transversely circumferentially extending rib 75b. The ribs 75a and 75b cooperate together to define continuous integral shoulder means 75c for engagement about three sides of each of the bumps 56. These socket areas 75 function and operate in the same manner as described in connection with the description of the socket areas 65. In other words, the ribs 75b are adapted to engage axially behind the bumps 56 while the ribs 75a are adapted to engage on circumferentially opposite sides of the bumps 56 to insure corotation of the ring with the wheel.

The intermediate ring portion 74 is joined with the arcuate outer ring margin 72 by an annular rim engaging shoulder 76 which is adapted to abut against the tire rim at the junction of the tire rim flanges 55 and 57. The outer ring margin 72 is formed in an arcuate manner so that wheel balancing weights may be carried on the terminal rim flange in such a way that it will not interfere with the cover and so that they will be substantially concealed by the outer ring margin 72.

The cover member 69 includes an outer circular margin 78 terminating in an annular bead 79 which is resiliently deflectable and adapted to be biased over the body part shoulder area or nose portion 50a and retainingly engaged within the body part seat 50b defined on the axially inner side of the body part nose portion 50a.

The cover member 69 may be removed in any suitable manner such as by inserting a pry-off tool underneath the bead 79 and forcing the bead over the body part nose portion 50a to disengage it from the body part 50.

The ring 70 may be assembled with the wheel and removed from the wheel in the same manner as described in connection with the cover 60.

It will be noted that the vehicle tire 59 is provided with a valve stem 80 which is adapted to extend outwardly through ring opening 81 when the ring 70 is mounted on the wheel so that the tire may be inflated without removing the ring 75 from the wheel.

The reference numeral 110 (Figs. 11–14) indicates generally a wheel structure which is of a more or less conventional construction and includes rim and body parts 111 and 112 respectively. It will be appreciated, the rim and body parts are welded together at their junction 113. In addition, the body part 111 is provided with a bolt on flange 114 which may be secured by bolts, cap screws and the like (not shown) to an automobile and the like.

The tire rim 112 is of a conventional multi-flange stepped construction including an intermediate axially extending flange 115. The flange 115 is connected at its axially outer extremity to a generally radially extending flange 116 terminating in an axially extending terminal flange 117. A conventional tire assembly 118 is adapted to be carried upon the rim and body parts in a conventional manner. The tire may be either of the tube or tubeless type and lends itself to be inflated by means of a valve stem 119, as is seen in Figure 10.

Provided on the generally axially extending rim flange 115 are a series of circumferentially spaced pressed out bumps or shoulders 120. Retainingly cooperable with the wheel in overlying concealing disposition, is my novel wheel cover 125. The cover 125 may be comprised of a sheet metal stamping and may be made from any suitable material such as stainless steel sheet and the like.

The cover 125 is of the dished type and has a relatively flat central crown 126. Disposed radially outwardly from the crown 126 is an indented annular rib 127 which in turn is connected radially outwardly to a relatively flat generally radially outwardly axially inclined extending surface 128. The cover also includes an outer margin 129 having a turned under pry-off bead 130 which in assembly may overlyingly conceal the terminal rim flange 117.

Disposed between the annular surface 128 and the outer margin 129, is an annular dished portion 131 having a generally axially inwardly radially outwardly extending flange portion 132, a generally radially extending annular flange portion 133, and a generally axially outwardly extending flange portion 134. The flange portion 134 is preferably of a slightly larger diameter than the inside diameter defined by the inner surface of the axial rim flange 115. It will suffice, however, if the diameter is merely slightly greater than the diameter of the circle in which bumps 120 are arranged.

The axial cover portion 134 is connected with the cover margin 129 by an annular reinforcing rib 135 which is adapted to bottom against the rim flange 116 when the cover is assembled upon the wheel. The generally axially extending resilient or flexible flange 134 is flared generally radially and axially outwardly at 135a until it merges into reinforcing rib 135 to provide clearance for reasons which will hereinafter become apparent.

Provided on the resilient or flexible generally axially extending cover portion 134, at circumferentially spaced intervals, are pressed out indentations or pockets 140. Preferably, these indentations 140 each include a pocket or seat 141 which is defined at its outer periphery by an annular or endless reinforcing rib 142.

In the present instance, each of annular ribs 142 are pressed out generally radially outward to be capable of cooperating and enveloping the bumps 120 when the cover is in assembly with the wheel.

The instant rib 142 serves a multiple of functions; the rib acts to define a seat and provide a reinforced connection between the cover and wheel; the rib provides a lead-in portion 143; and by reason of its enveloping the bump 20 the rib serves to insure corotation of the cover on the wheel.

Any suitable number of the bumps 120 and the pockets 140 may be provided. In the illustrated embodiment, as is seen in Figure 10, four separate pockets 140 appear.

In the assembly of the cover upon the wheel, the valve stem 119 is initially centered with respect to a corresponding opening in the cover and it is in this manner that the pockets 140 are brought into axial alignment with the bumps 120. Upon the application of an axially inward force, as will be best seen in Figure 14, it will be noted the lead-in portion 143 engages against the axially outer surface of the bumps 120 and upon further application of force the flexible axial cover flange portion 134 is caused to flex radially inwardly with the cover shown in maximum flexed position by the dotted line cover illustration in Figure 14. Eventually the seat 141 is caused to be brought into registry with the bump 120. At this time, the rib 142 extends around the periphery of the bump 120 to insure corotation. The rib 135 in assembly is bottomed against the rim flange 116 to stabilize the cover on the wheel and to provide a surface against which the tip of a pry-off tool may be applied to disengage the cover from the wheel.

The present application, in part, discloses and claims subject matter disclosed in my now abandoned patent applications, Serial No. 513,952, filed June 8, 1955, Serial No. 750,536, filed July 23, 1958 and Serial No. 573,859, filed March 26, 1956.

It will be understood that modifications and variations may be effected without departing from the scope of the novel concepts of the present invention.

I claim as my invention:

1. In a wheel structure including a wheel having rim and body parts with one of the parts having a generally axially extending flange provided with circumferentially spaced radially facing bumps, a cover member for overlying disposition upon the wheel having a generally axially extending resilient cover portion, said axially extending resilient cover portion provided with circumferentially spaced seats opening outwardly of the cover member each cooperable with one of said bumps, each of said seats being bounded generally at its periphery by a rib offset outwardly of the cover member to engage the periphery of the associated bump to insure corotation and to space the axially extending resilient cover portion from the wheel.

2. In a wheel structure including a wheel having rim and body parts with one of the parts having a generally axially extending flange provided with circumferentially spaced radially facing bumps, a cover member for overlying disposition upon the wheel having a generally axially extending resilient cover portion, said axially extending resilient cover portion provided with circumferentially spaced seats opening outwardly of the cover member each cooperable with one of said bumps, each of said seats being bounded generally at its periphery by a rib offset outwardly of the cover member to engage the periphery of the associated bump to insure corotation and to space the axially extending resilient cover portion from the wheel, said rib having an axially inner offset lead-in surface to act against the bump during assembly to spring said axial cover portion and permit engagement of each of the bumps in its respective seat.

3. In a wheel structure including a wheel having rim and body parts with one of the parts having a generally axially extending flange provided with circumferentially spaced radially inwardly offset protuberances, a cover member in overlying engagement upon the wheel and having a dished cover portion, said dished cover portion including an annular resilient generally axially extending cover portion, said axially extending cover portion provided with circumferentially spaced generally radially outwardly extending annular ribs each being disposed about the perimeter of the associated seat with each of said seats and ribs being retainingly engaged with one of said protuberances and with the annular ribs spacing the axially extending cover portion from the wheel.

4. In a wheel structure including a wheel having rim and body parts with the rim part having a generally axially extending intermediate flange provided with circumferentially spaced radially inwardly facing bumps, a cover member in overlying engagement upon the wheel and having a dished cover portion, said dished cover portion including an annular resilient generally axially extending cover portion, said axially extending cover portion provided with circumferentially spaced generally radially outwardly extending annular ribs each defining an annular seat with the annular ribs spacing the axially extending cover portion from the tire rim upon each of said seats and ribs being retainingly engaged with one of said protuberances, said seats being disposed in a common circle and with said annular ribs having a diameter slightly in excess of the outside diameter of the bumps so the ribs may be swung into tensioned cover retaining engagement with the bumps.

5. In a wheel structure including a wheel having rim and body parts with one of the parts having circumferentially spaced radially facing bumps, a cover member for overlying disposition upon the wheel including an axial cover area confronting the bumps, the cover area having means for retaining the cover member on the wheel as well as spacing the axial cover area from the wheel, said means comprising circumferentially spaced depressed areas defining radially opening seats with the bumps engageable in the seats, each of the depressed areas being peripherally bounded by a radially offset rib area engageable about the periphery of the bump to insure corotation of the cover member and the wheel and with the offset rib area spacing the axial cover area radially from the wheel.

6. The wheel structure of claim 5 further characterized by each of said depressed areas comprising U-shaped ribs.

7. The wheel structure of claim 5 further characterized by each of said depressed areas comprising H-shaped ribs.

8. The wheel structure of claim 5 further characterized by said cover member comprising a ring member and with said means for retaining the cover member on the wheel being disposed between radially inner and outer margins of the ring in radially confronting relation to the bumps on the wheel.

9. A cover member for disposition on the outer side of a wheel having a generally axially extending intermediate flange carrying circumferentially spaced radially inwardly projecting bumps, said cover member having a dished circular body including a relatively resilient intermediate generally axially extending flange portion for overlying the intermediate rim flange and having pressed out radially outwardly thereof at circumferentially spaced intervals axially outwardly opening embossed areas including a curved shoulder area to engage the bumps on three sides thereof capable of cover retaining engagement behind the bumps and on two sides of the bumps to insure relative corotation of the cover member and wheel.

10. A cover member for disposition on the outer side of a wheel having a generally axially extending intermediate flange carrying circumferentially spaced radially inwardly projecting bumps, said cover member having a circular body including a relatively resilient intermediate generally axially extending flange portion for overlying the intermediate rim flange and having pressed out radially outwardly thereof at circumferentially spaced intervals axially outwardly opening embossed areas each including continuous shoulder area to engage the bump on three sides thereof capable of cover retaining engagement behind the bump and on two sides of the bump to insure relative corotation of the cover member and wheel, said continuous shoulder having an angled reinforcing portion to back up the three sided engagement of the bump and providing a lead-in ramp for guiding the bump into cover retaining engagement with the shoulder.

11. In a wheel structure including body and rim parts with the rim part having a generally axially extending intermediate flange provided with a plurality of circumferentially spaced bumps, a dished cover member for disposition on the outer side of the wheel including an intermediate generally axially extending relatively resilient flange portion comprising a side wall of the dished cover member provided with a plurality of circumferentially spaced elements capable of being engaged in tensioned cover retaining relationship with the bumps, said elements including a generally radially outwardly bulged protruding area bottomed behind the bumps and said bulged area including means cooperable with the bumps for insuring relative corotation of the cover member and wheel.

12. A cover member for disposition on the outer side of a wheel having a generally axially extending intermediate flange carrying circumferentially spaced radially inwardly projecting bumps, said cover member having a circular body including a relatively resilient intermediate generally axially extending portion for overlying the intermediate rim flange and having radially thereof at circumferentially spaced intervals integrally formed U-shaped shoulder-like portions capable of cover retaining engagement behind and about the bumps, said shoulder-like portions having a reinforcing portion constituting a lead-in camming surface projecting radially and axially outwardly of the axially extending flange portion by which the cover member is progressively cammed over the bumps into retaining engagement.

13. In a wheel structure including a tire rim having an intermediate rim flange bearing circumferentially spaced bumps, a cover structure having an annular dished area including an axially extending flexible cover portion in radial confronting relation to the intermediate rim flange and with the axially extending cover portion bearing a series of circumferentially spaced radially facing socket areas arranged in a common circle for cooperation with the bumps to sustain the cover structure in assembly on the wheel, said socket area comprising a U-shaped rib-like area engaged axially behind the bump and with the legs of the U-shaped rib-like area extending axially outwardly of the bottom of the U-shaped rib-like area and being disposed on circumferentially spaced opposite sides of the bump to insure corotation of the cover with the wheel.

14. In a wheel structure including a tire rim having an intermediate rim flange bearing circumferentially spaced bumps, a cover structure having an annular dished area including an axially extending flexible cover portion in radial confronting relation to the intermediate rim flange and with the axially extending cover portion bearing a series of circumferentially spaced radially facing socket areas arranged in a common circle for cooperation with the bumps to sustain the cover structure in assembly on the wheel, said socket area comprising a U-shaped rib-like area disposed between the intermediate rim flange and the axial cover portion with the bottom of the U-shaped rib-like area engaged axially behind the bump and with the legs of the U-shaped rib-like area extending axially outwardly of the bottom of the U-shaped rib-like area and being disposed on circumferentially spaced opposite sides of the bump to insure corotation of the cover with the wheel, said cover structure including an outer cover margin and an annular radial cover portion linking the outer cover margin with the axially extending flexible cover portion and with the radial cover portion bottomed against the tire rim and extending circumferentially across the legs of the U-shaped rib-like areas defining with the projection areas the socket areas.

15. In a wheel structure including a tire rim having an intermediate rim flange bearing circumferentially spaced bumps, a cover structure having an annular dished area including an axially extending flexible cover portion in radial confronting relation to the intermediate rim flange and with the axially extending cover portion bearing a series of circumferentially spaced radially facing socket areas arranged in a common circle for cooperation with the bumps to sustain the cover structure in assembly on the wheel, said socket area comprising a U-shaped rib-like area disposed between the intermediate rim flange and the axial cover portion with the bottom of the U-shaped rib-like area engaged axially behind the bump and with the legs of the U-shaped rib-like area extending axially outwardly of the bottom of the U-shaped rib-like area and being disposed on circumferentially spaced opposite sides of the bump to insure corotation of the cover with the wheel, said U-shaped rib-like area comprising a radially outwardly pressed-out area of the axially extending cover portion and with the bottom of the U at its axially inner side having a generally radially and axially inclined lead-in ramp surface for guiding the bump into the socket area.

16. In a wheel structure including a rim part having a generally axially extending intermediate flange provided with a plurality of radially inwardly offset circumferentially spaced bumps, a dished cover member for disposition on the outer side of the wheel including an intermediate generally axially extending relatively resilient flange portion comprising a side wall of the dished cover, the side wall being provided with a plurality of circumferentially spaced generally U-shaped areas radially offset from the resilient flange portion, the U-shaped areas being annularly arranged and being capable of tensioned cover retaining engagement with the bumps to sustain the dished cover member on the rim part.

17. In a wheel structure including a wheel having rim and body parts with one of the parts having a generally axially extending flange provided with circumferentially spaced radially facing bumps, a cover member for overlying disposition upon the wheel having a generally axially extending resilient cover portion, said axially extending resilient cover portion provided with circumferentially spaced seats each cooperable with one of said bumps, each of said seats being bounded generally at its periphery by an annular rib to engage about the periphery of the associated bump to insure corotation and to space the axially extending resilient cover portion from the wheel, each of said ribs being pressed out in a generally radial direction relative to said generally axial resilient cover portion and being arranged in a common circle and further with the seat enclosed by the annular ribs.

18. The wheel structure of claim 17 further characterized by each of the circumferentially spaced seats comprising a pair of axially extending circumferentially spaced ribs as well as a transverse generally circumferentially extending rib comprising the radially outwardly bulged protruding area which transverse rib is disposed intermediate the opposite ends of the pair of axially extending ribs and links the axially extending ribs together, the seats each having an H-shaped configuration and with the portions of the ribs disposed at the axially inner side of the transverse rib comprising means for centering the bumps with respect to the transverse ribs incident to the assembly of the cover member on the wheel.

19. The wheel structure of claim 17 further characterized by each of the circumferentially spaced seats comprising a pair of axially extending circumferentially spaced ribs as well as a transverse generally circumferentially extending rib comprising the radially outwardly bulged protruding area which transverse rib is disposed between the pair of axially extending ribs and links the ribs together, the elements each having a U-shaped configuration.

References Cited in the file of this patent

UNITED STATES PATENTS

| | | |
|---|---|---|
| 2,308,617 | Lyon | Jan. 19, 1943 |
| 2,544,705 | Lyon | Mar. 13, 1951 |
| 2,624,628 | Lyon | Jan. 6, 1953 |
| 2,624,640 | Lyon | Jan. 6, 1953 |
| 2,631,066 | Horn | Mar. 10, 1953 |
| 2,675,040 | Raun et al. | Apr. 13, 1954 |